United States Patent [19]

Bernhardt et al.

[11] Patent Number: 5,572,617
[45] Date of Patent: Nov. 5, 1996

[54] HOUSING FOR OPTICAL COMPONENTS

[75] Inventors: Susanne Bernhardt; Axel Thiel; Eberhard Kahle; Paul Oehlkers; Peter Grugel, all of Berlin, Germany

[73] Assignee: Krone Aktiengesellschaft, Berlin-Zehlendorf, Germany

[21] Appl. No.: 427,288

[22] Filed: Apr. 21, 1995

[30] Foreign Application Priority Data

Apr. 26, 1994 [DE] Germany ............................ 44 15 218.3

[51] Int. Cl.⁶ ...................................................... G02B 6/00
[52] U.S. Cl. ........................................................... 385/135
[58] Field of Search .................................. 385/134, 135, 385/136, 137, 147, 59, 71, 65, 83

[56] References Cited

U.S. PATENT DOCUMENTS 4,840,449  6/1989  Ghandeharizadeh ................... 385/135
4,865,413  9/1989  Hubner et al. ............................. 385/65
5,285,515  2/1994  Milanowski et al. ................... 385/135

FOREIGN PATENT DOCUMENTS

4302837A1  8/1994  Germany.
53-30112   3/1981  Japan ....................................... 385/65

Primary Examiner—John Ngo
Attorney, Agent, or Firm—McGlew and Tuttle, P.C.

[57] ABSTRACT

A housing for optical components includes a lower housing portion and at least one holder for glass fibers, couplers and splices. It is intended to provide a housing that can flexibly be adjusted and permits accommodation of a larger number of splices. This is achieved by that the holder for splices and couplers is a separate component and can-be snap-fitted onto the bottom of the lower housing portion.

16 Claims, 2 Drawing Sheets

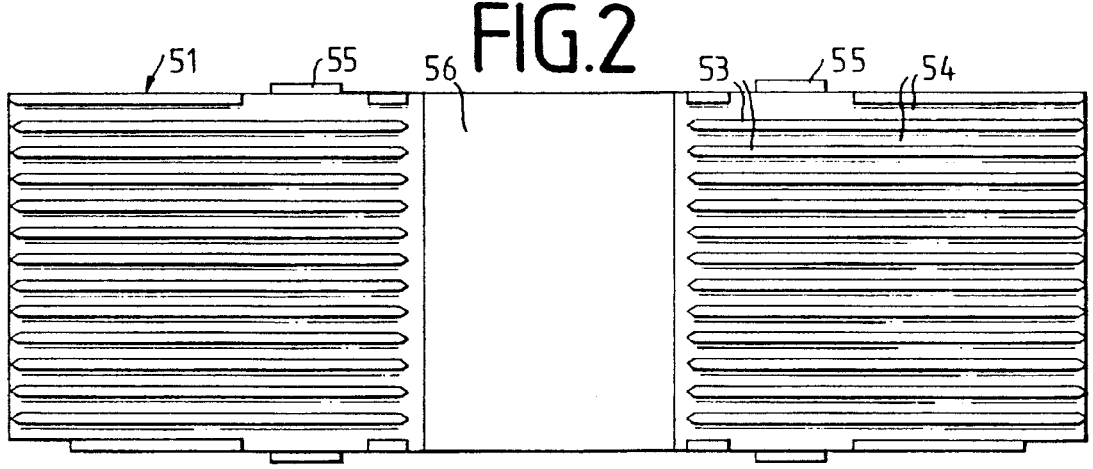
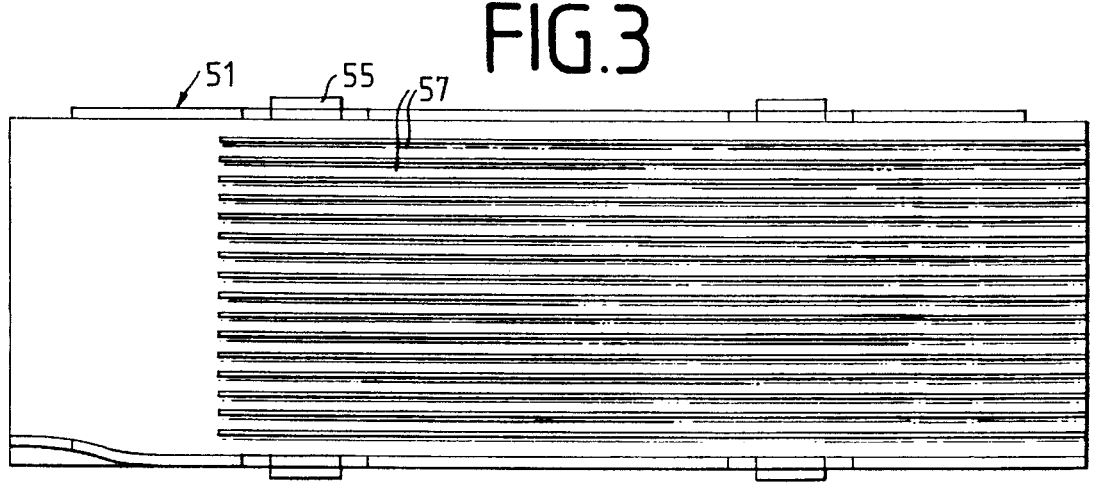
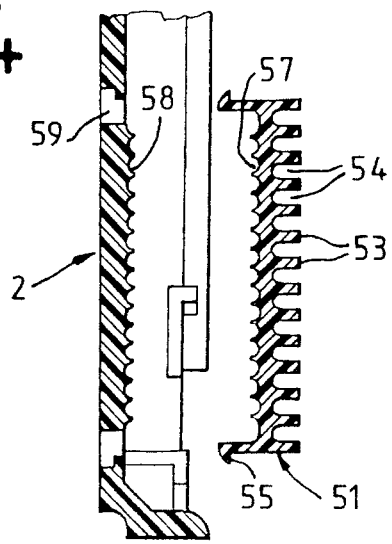

HOUSING FOR OPTICAL COMPONENTS

FIELD OF THE INVENTION

The present invention relates to a housing for optical components including a lower housing portion and at least one holder for glass fibers, couplers and splices.

BACKGROUND OF THE INVENTION

From the not published DE 43 02 837 A1 there is known in the art a housing comprising a lower housing portion and a cover for receiving optical components, such as glass fibers, couplers and splices. The housing serves for the protection of the splice and coupling positions of glass-fiber cables and for the accommodation of the necessary reserve lengths of glass fibers, in conjunction with the splice and coupling positions. The housing has a modular construction. Depending on the requirements, a different number of lower housing portions can be stacked in each other. The glass fibers connecting the lower housing portions are each introduced through the housing bottoms. The lower housing portion is provided with holders integrated in the bottom for receiving couplers and splices. During the final assembly, the lower housing portion or several lower housing portions are combined with the cover so to form a housing or a housing unit.

Disadvantageous, in this prior art housing, is the lack of flexibility when fitting the housing with components. The number of possible splices is limited by the holders integrated in the bottom. When the integrated holders are damaged, the complete lower housing portion has to be replaced.

SUMMARY AND OBJECTS OF THE INVENTION

It is therefore the object of the invention to provide a housing for optical components of the type referred to hereinbefore that can flexibly be adjusted and which permits accommodation of a larger number of splices.

According to the invention, a housing for optical components is provided comprising a lower housing portion and at least one holder for glass fibers, couplers and splices. The holder is provided as a separate component and can be snap-fitted onto a bottom of the lower housing portion.

By the configuration of the holders for splices and couplers as separate components to be snap-fitted onto the bottom of the housing, two holders for splices and couplers or one holder for couplers and one holder for splices can be snap-fitted onto the bottom of the housing, depending on the requirements. If, e.g., no couplers are required, two holders for splices can be used. Thus the number of possible splices is doubled. When the holder for couplers is removed from the lower housing portion, a planar coupler can be mounted instead of a second holder for splices. Further, it is possible to snap-fit two holders for couplers onto the lower housing portion. The necessary splices are then obtained by recoat splicing. When a holder for splices and couplers will be damaged, the respective holder can easily be replaced, without replacing the complete lower housing portion.

The upper side of the holder for splices is preferably formed of two spaced comb-type sections between which a plane free area extends over the full width of the holder. Guide grooves formed by the two comb-type sections are aligned to each other. The webs at the ends are preferably V-shaped. The bottom areas of the grooves formed by the comb-type sections are at the same level as the plane free area. The lower side of the holder comprises depressions extending in parallel to the guide grooves and the depressions are preferably provided on the bottom of the lower housing portion. The depressions form closed channels together with the depressions of the holder. The holders for splices or couplers, respectively, comprise two latches each to be snap-fitted in corresponding recesses of the bottom of the lower housing portion.

By the configuration of the holder for splices of two comb-type sections, between which a plane free area a planar surface extends transversely over the full width of the holder, the number of possible splices can again be increased. The plane free area between the comb-type sections permits crossings of glass fibers without falling below their admissible bending radii. Further, e.g. for repair splices, additional detour lengths are not required.

By the depression-type configurations at the bottom sides of the holders forming closed channels together with depressions at the bottom of the housing, a single placement of switch wires in parallel to the longitudinal axis of the holder underneath thereof is made possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a top view of the holder for splices;

FIG. 3 is a bottom view of the holder for splices; and

FIG. 4 is a partial section of the lower housing portion according to line IV—IV in FIG. 1 with the not yet snap-fitted holder for splices.

DETAILED DESCRIPTION OF THE PREFERRED EMBODIMENT

Figure 1:
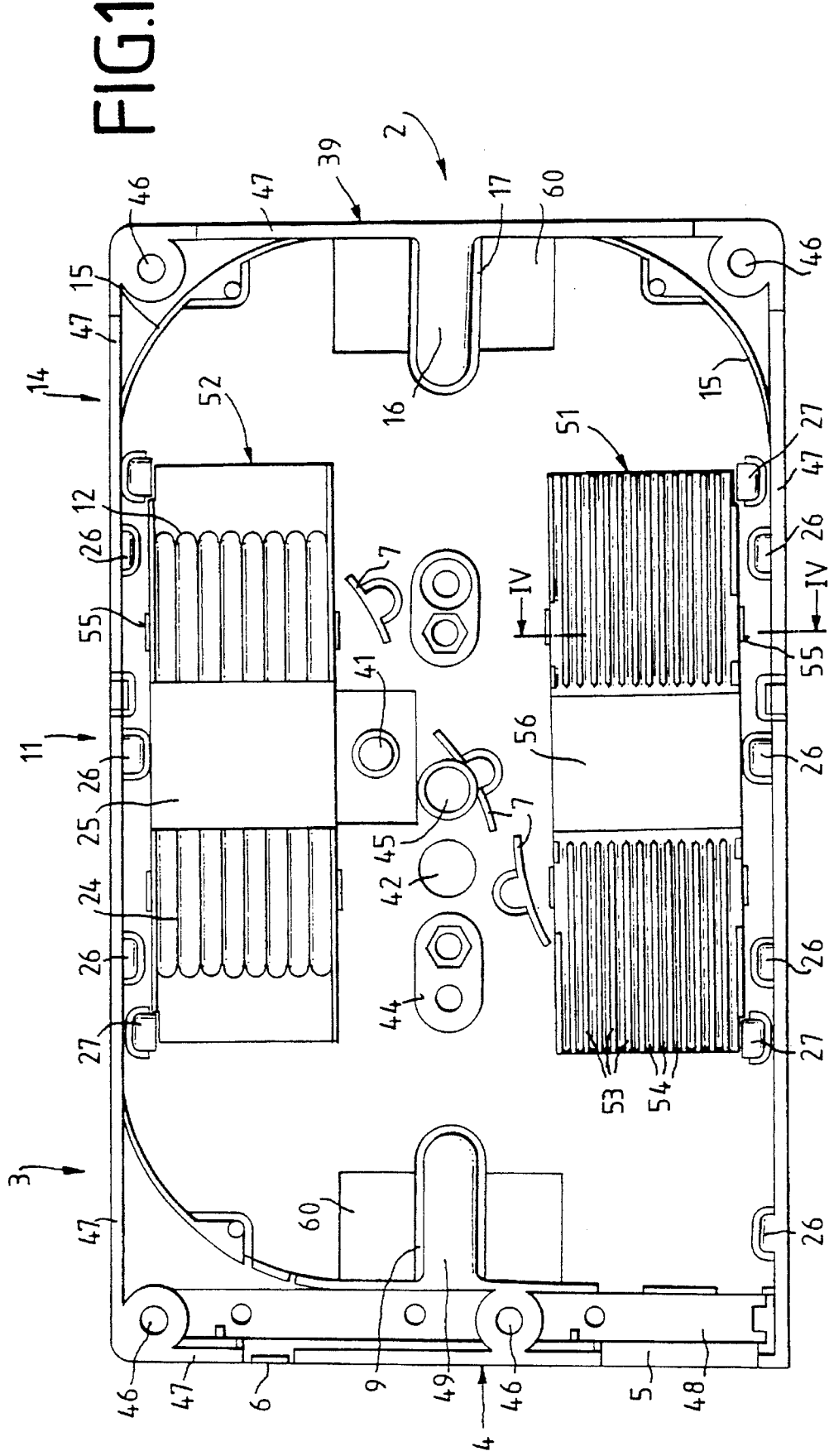
FIG. 1 is a top view of the lower housing portion.

The housing for optical components comprises a lower housing portion 2 and a not shown cover. The lower housing portion 2 is substantially split up into a front entry area 3 with entries and exits 5, 6 for the glass fibers integrated at the front side 4, and a holding-down device 49 above a bottom opening 9 of the lower housing portion 2, into a central area 11 with holders 51, 52 for splices or couplers, respectively, and with curved deflection elements 7, and into a rear area 14 with curved wall portions 15 for guiding the glass fibers and a holding-down device 16, which is disposed above a bottom opening 17 of the lower housing portion 2. The areas 3 and 14 are selected so that the minimum bending radii for the glass fibers are observed when introducing them into the holders 51, 52 for splices or couplers, respectively. From the wall of the narrow side 39 provided in the rear area, the holding-down device 16 above the bottom opening 17 is formed. The bottom opening 9 is formed in the entry area 3 in the same way as the bottom opening 17 of the area 14 and serves for guiding glass fibers in and out, e.g. from another lower housing portion 2.

Between the holders 51, 52 for splices and couplers are provided a pin 41, a bore 42, two elliptically shaped portions 44 and a bore 45, to the border of which a cylindrical wall having the height of the elliptically shaped portions 44 follows. The shaped portions serve for the attachment of the cover and for the attachment to a not shown subrack or fox the adaptation of the housing to the installation environment, respectively. In the elliptically shaped portions 44 there are provided one bore and a hexagonal depression each. Bores 46 located in the corners of the circumferential wall 47 also serve for the attachment of the cover or to the combination of several lower housing portions 2, respectively. The entry 5 is integrated in the front side 4 or is configured as a separate component and inserted in the front side 4. Behind the entry 5 is provided a depression 48, into which a strain relief device can be inserted as a separate component. The strain relief device is preferably composed of two plates screwed to each other and having central recesses for the insertion of glass fibers. The bottom openings 9, 17 of the lower housing portion 2 are each configured portions 60 inclined towards the center for an optimum guidance of the glass fibers.

From the wall 47 there are internally formed holding-down devices 26 serving for a safe guidance of the glass fibers. Between the wall 47 and the holders 51, 52 for splices or couplers, respectively, are each formed two further cable guiding portions 27 providing, together with the holding-down devices 26, for a safe guidance of the glass fibers in the area of the holders 51, 52 for splices or couplers, respectively.

The holders 51, 52 for splices or couplers, respectively, are configured as separate, easily exchangeable components with four latches 55 each that can be snap-fitted in recesses 59 of the bottom of the lower housing portion 2.

The holder 52 for couplers preferably comprises eight guide grooves 24 forming the receiving portions 12 for preferably eight couplers. The guide grooves 24 are interrupted by an approximately centrally arranged free area or planar surface region 25 extending transversely to their longitudinal direction 24. The free area serves for the application of a glue material. The couplers are safely fixed by means of an adhesion film in the guide grooves 24 or planar surface region 25. The free area 24 lies slightly deeper than the deepest point of the guide grooves 24, so that by application of double-sided adhesion foils an additional coupler fixation can be achieved.

The upper side of the holder 51 for splices shown in FIGS. 2 to 4 comprises two comb-type sections between which a plane free area or planar surface 56 extends over the full width of the holder 51. Each comb-type section is composed of webs 53 disposed in parallel to the longitudinal axis of the holder 51 for splices and having an equidistant spacing to each other. Between each two webs 53 there is formed a groove 54 into which the glass fiber together with the splice protection is inserted. The webs 53 are V-shaped at the ends, in order to maintain the minimum bending radii when inserting the glass fibers. The bottom areas of the grooves 54 are at the same height as the plane free area 56. At the side faces there are disposed two latches 55 each in the area of the comb-type sections, said latches being snap-fitted into matching recesses 59 in the bottom of the lower housing portion 2. The plane free area or planar surface 56 is disposed centrally and extends approximately over one fourth to fifth of the total length of the holder 51. The grooves 54 of the two comb-type sections are aligned to each other. By the construction of the holder 51 for splices with two comb-type sections a higher packing density for the placement of the splices and a crossing of fibers without falling below the admissible bending radii are made possible. Further, there is no necessity of additional detour lengths for, e.g., repair splices, where fiber pieces are spliced in for extensions.

On the bottom side of the holder 51 for splices there are provided semi-circular depressions 57, the diameter of which approximately corresponds to the diameter of the switch wires. Together with semi-circular depressions 58 formed in the bottom of the lower housing portion 2, closed channels result (FIG. 4) through which the switch wires can individually be passed underneath the holder 51 for splices. The bottom side of the holder 52 for couplers can be configured in an analogous manner to the bottom side of the holder 51 for splices.

By the configuration of the holders 51, 52 for splices or couplers, respectively, as separate components to be snap-fitted on the lower housing portion 2, a variable arrangement of the lower housing portion 2 with splices and couplers is achieved. It is possible, for instance, to configure the housing as a pure splice cassette, by snap fitting a second holder 51 for splices into the lower housing portion 2, instead of the holder 52 for couplers. When using planar couplers, e.g., a holder 52 for couplers is not required. When the splices are not placed in a special splice holder, the holder 51 for splices is not required, and a second holder 52 for couplers can be used instead, thus the packing density during assembly in external housing concepts being increased, since then simple constructions with higher numbers of input and output ports are made possible. By the V-shaped configuration of the webs 53 at the ends, an introduction of the glass fibers is possible while observing the minimum bending radii. This is then particularly important, when a glass fiber has to be introduced from the one comb-type section into a groove 54 not aligned therewith of the other comb-type section.

While a specific embodiment of the invention has been shown and described in detail to illustrate the application of the principles of the invention, it will be understood that the invention may be embodied otherwise without departing from such principles.

What is claimed is:

1. A housing for optical components, comprising a lower housing portion; at least one holder for holding glass fibers, couplers or splices; said holder being provided as a component separate from said lower housing portion; and snap fit means provided on said lower housing portion and said holder, said snap fit means for snap fit of said holder into a bottom of said lower housing portion; said holder having a lower side comprising depressions, an upper side of said holder including a comb-type section defining guide grooves, said depressions extending in parallel to said guide grooves, said lower housing portion including depressions whereby said depressions of said lower housing portion cooperate with depressions of said holder to form channels between said lower housing portion and said holder.

2. A housing according to claim 1, wherein said holder is a splice holder including said upper side, said holder further comprising a second comb-type section with a planar surface formed between said comb-type sections, said planar surface extending over a full width of said holder.

3. A housing according to claim 2, wherein said guide grooves include two sets of guide grooves formed by said two comb-type sections, said guide grooves being aligned to each other.

4. A housing according to claim 1, wherein said comb-type section of said holder includes webs defining guide grooves, said webs having v-shaped ends.

5. A housing according to claim 2, wherein a bottom area of grooves formed by said comb-type sections are at a same level as said planar surface.

6. A housing according to claim 1, wherein said snap fit means includes latches provided on said holder and recesses provided on a bottom of said lower housing portion, said latches each being snap fittable into corresponding said recesses of said lower housing portion.

7. A housing for optical components, comprising:

a lower housing portion;

at least one holder for holding glass fibers, couplers or splices, said holder being provided as a component separate from said lower housing portion, said holder having a lower side comprising depressions and an upper side defining guide grooves, said depressions extending in parallel to said guide grooves, said lower housing portion including depressions formed on a surface thereof and opposite said depressions in said holder, said depressions of said lower housing portion cooperating with said depressions of said holder to form channels between said lower housing portion and said holder, said guide grooves being formed by two spaced, comb-type sections with a planar surface region between said comb-type sections, said planar surface region extending over a full width of said holder.

8. A housing for optical components according to claim 7, wherein:

said lower housing portion extends farther than said holder in a direction substantially parallel to said holder.

9. A housing for optical components according to claim 7, further comprising:

another holder for holding glass fibers, couplers or splices, said another holder being provided as a component separate from said lower housing portion, said another holder having a lower side comprising depressions and an upper side defining guide grooves, said depressions extending in parallel to said guide grooves, said lower housing portion including other depressions formed on a surface thereof, said other depressions of said lower housing portion cooperating with said depressions of said another holder to form channels between said lower housing portion and said another holder.

10. A housing for optical components according to claim 7, wherein:

said lower housing includes a holding down device spaced from said depressions formed on said surface of said lower housing.

11. A housing for optical components according to claim 7, wherein:

said lower housing includes a strain relief device spaced from said depressions formed on said surface of said lower housing.

12. A housing for optical components according to claim 7, wherein:

said depressions are a different size than said guide grooves.

13. A housing for optical components according to claim 7, wherein:

said depressions have a diameter substantially equal to a diameter of a switch wire.

14. A housing for optical components according to claim 7, wherein:

said channels have a dimension through which switch wires can be passed.

15. A housing for optical components, comprising a lower housing portion; at least one holder for holding glass fibers, couplers or splices; said holder being provided as a component separate from said lower housing portion; and snap fit means provided on said lower housing portion and said holder, said snap fit means for snap fit of said holder into a bottom of said lower housing portion; said holder having a lower side comprising depressions, an upper side of said holder including a comb-type section defining guide grooves, said depressions extending in parallel to said guide grooves, said lower housing portion including depressions whereby said depressions of said lower housing portion cooperate with depressions of said holder to form channels; said snap fit means includes latches provided on said holder and recesses provided on a bottom of said lower housing portion, said latches each being snap fittable into corresponding said recesses of said lower housing portion.

16. A housing for optical components, comprising:

a lower housing portion;

at least one holder for holding glass fibers, couplers or splices, said holder being provided as a component separate from said lower housing portion, said holder having a lower side comprising depressions and an upper side defining guide grooves, said depressions extending in parallel to said guide grooves, said lower housing portion including depressions formed on a surface thereof and opposite said depressions in said holder, said depressions of said lower housing portion cooperating with said depressions of said holder to form channels between said lower housing portion and said holder, said guide grooves are formed by two spaced, comb-type sections with a planar surface region between said comb-type sections, said planar surface region extending over a full width of said holder, said depressions being a different size than said guide grooves.

* * * * *